(12) United States Patent
Chinoy (10) Patent No.: US 11,679,894 B1
(45) Date of Patent: *Jun. 20, 2023

(54) SYSTEM AND METHOD FOR ENABLING THE EMERGENCY REMOTE OVERRIDE OF A HIJACKED OPERATION OF A VEHICLE, A DEVICE OR A FACILITY

(71) Applicant: Rayomond H. Chinoy, Tampa, FL (US)

(72) Inventor: Rayomond H. Chinoy, Tampa, FL (US)

( * ) Notice: Subject to any disclaimer, the term of this patent is extended or adjusted under 35 U.S.C. 154(b) by 67 days.

This patent is subject to a terminal disclaimer.

(21) Appl. No.: 17/404,048

(22) Filed: Aug. 17, 2021

Related U.S. Application Data (63) Continuation-in-part of application No. 15/834,746, filed on Dec. 7, 2017, now Pat. No. 11,092,957.

(60) Provisional application No. 62/475,226, filed on Mar. 23, 2017.

(51) Int. Cl.
| | | |
|---|---|---|
| *G08G 5/00* | (2006.01) | |
| *B64U 101/00* | (2023.01) | |
| *B64D 45/00* | (2006.01) | |
| *B64C 39/02* | (2023.01) | |

(52) U.S. Cl.
CPC ........ *B64D 45/0018* (2019.08); *B64C 39/024* (2013.01); *G08G 5/0056* (2013.01); *B64U 2101/00* (2023.01)

(58) Field of Classification Search
CPC ............ B60K 35/00; B60W 2050/007; B60W 2420/42; B60W 2555/60; B60W 30/12; B60W 50/023; B60W 50/082; B60W 50/14; B60W 60/0018; B60W 60/0053; G05D 1/0061; G05D 1/0231; G05D 2201/0213
See application file for complete search history.

(56) References Cited

U.S. PATENT DOCUMENTS

2013/0100986 A1* 4/2013 Gettings ................ H04B 1/713
901/1

* cited by examiner

*Primary Examiner* — Ryan Rink
(74) *Attorney, Agent, or Firm* — Glenn E. Gold, P.A.; Glenn E. Gold (57) ABSTRACT

A navigation controller system and method for retrieving control of a remotely controlled device includes an onboard primary controller supportable on a remotely controlled device and adapted to control operation thereof, a base controller adapted to communicate with the onboard primary controller by a first mode of communications to provide instructions to control and operate the remotely controlled device, and an auxiliary controller module supportable on the remotely controlled device either separately from or integrated into the onboard primary controller and adapted to communicate with the base controller by a second mode of communications not the same as the first mode of communications so that the auxiliary controller module acts as a backup to disable, disconnect or otherwise take over control from the onboard primary controller when it is rendered non-responsive to communications from the base controller.

18 Claims, 6 Drawing Sheets

SYSTEM AND METHOD FOR ENABLING THE EMERGENCY REMOTE OVERRIDE OF A HIJACKED OPERATION OF A VEHICLE, A DEVICE OR A FACILITY

CROSS-REFERENCE TO RELATED APPLICATIONS

This application is a continuation-in-part (CIP) of U.S. patent application Ser. No. 15/834,746, filed on Dec. 7, 2017 (issuing on Aug. 17, 2021 as a U.S. Pat. No. 11,092,957), which, in turn, claims the benefit of U.S. provisional patent application No. 62/475,226, filed on Mar. 23, 2017. The entire content of both aforementioned patent applications is incorporated-by-reference herein.

FIELD OF THE INVENTION

The present invention relates generally to systems for remotely accessing and/or controlling the operation of vehicles, devices and facilities. More particularly, the invention pertains to a system and method enabling the emergency remote override of one or more operations of such vehicles, devices and facilities.

BACKGROUND OF THE INVENTION

With continuing advances in technology, more and more vehicles, devices, and industrial facilities are being adapted to enable remote access and control of their respective operations. While providing improvements in convenience and efficiency, conventional remote access and control systems are becoming increasingly susceptible to undesirable access by bad actors.

For example, as the present applicant described in U.S. Pat. No. 11,092,957, an influx of gadgets have been specifically developed to block, or otherwise interfere with, radio frequency (RF) communication signals relied upon during operation of remotely-controlled devices and vehicles, such as flying drones. In some instances, drone operations have been maliciously taken over by hijackers impersonating the controller and overwhelming the receiver by sending stronger signals to the device than the original transmitter, so the receiver believes it is still being governed appropriately. Moreover, as the flight range of modern drones increases, there is an increasingly likelihood of a drone flying out of range of the controller, running out of power, and potentially being lost. With batteries drained, there is often no way to find the crash site. Furthermore, even where the primary power source has not been depleted, the vehicle/device may still have traveled out of RF range such that owner/operator is unable to recall it.

With regard to navigable vehicles such as drones, it is known to supplement the software of the onboard system that normally controls the flight path of the drone so that a preplanned and programmed operation may be carried out in the event of the occurrence of an in-flight contingency. For instance, if an RF receiver of the onboard controller on the drone has failed or its RF signal is garbled by being jammed, and thus cannot regain communication with a remote base controller, a software module or computer program resident in the onboard controller can execute a user-specified preplanned operation to attempt to get the onboard controller back into RF communication with the remote base controller. However, in the case of most hijackings, the onboard controller may be unaware that the system is compromised and is being taken over. If the system doesn't recognize it has been compromised—or that its original (native) signal is being jammed—it does not proceed with the execution of the user-specified preplanned operation, which results in the loss of the drone.

Potential hijacking-type issues are not exclusive to conventional remotely-controlled drones and the like. For example, although conventional land vehicles such as automobiles and trucks are not "remotely controllable" in the traditional sense, more and more of their onboard systems are being configured to enable remote access in connection with telematics services (i.e. vehicle systems combining GPS and cellular technologies with onboard electronics) providing, for example, in-vehicle security, emergency services, hands-free calling, turn-by-turn navigation, remote diagnostics, and the like. Increasingly, such systems are being adapted to enable remote engine starting and shutdown, vehicle tracking, etc. Accordingly, such systems are becoming increasingly susceptible to undesirable outside interference, or hacking. Furthermore, so-called autonomous vehicles, while operating substantially on their own with little or no ongoing control from a remote operator, are susceptible to having their control taken over remotely by a bad actor—which could have disastrous consequences.

Furthermore, in addition to conventional land vehicles, ships/vessels and other water craft (both submersible and non-submersible), whether autonomous or semi-autonomous, are susceptible to the aforementioned undesirable exterior interference. Moreover, even completely non-autonomous ships (e.g. oil tankers) are susceptible to having their operations taken over by modern day pirates. In 2020, there were approximately 200 pirate attacks against ships worldwide.

Finally, even industrial plants have become increasingly susceptible to outside interference in the form of cyberattacks. Radio Frequency (RF) remote controllers that are used to operate connected industrial machines are particularly susceptible. In a study (*Risky Radio Remotes: Attack Classes and Attacker Models*), security firm Trend Micro suggests that the more rugged variety of radio controllers, used for heavy-duty purposes such as the control and automation of industrial machines such as cranes and drills, could be hijacked in a number of ways. RF controls use a transmitter to send out radio waves corresponding to a command, usually a press of a button, which a receiver interprets as an action—for example, opening up a garage door. The industrial version of this technology, which is used in various sectors such as construction, manufacturing and logistics, is highly vulnerable to hijacking. In fact, it has been found that weaknesses in the controllers can be easily taken advantage of to move full-sized machines such as cranes used in construction sites and factories. As in the case of drones, controllers that use RF are susceptible to command spoofing, where an attacker within range can capture radio traffic, selectively modify the packets, and automatically craft new commands.

SUMMARY OF THE INVENTION

The present invention is directed to an innovation providing a navigation controller system and method for retrieving control of a remotely controlled device that overcomes the deficiencies of the known art and the problems that remain unsolved by provision of an auxiliary controller module. The system and method provide an alternate way of sending instructions to a remotely controlled device in order to retrieve control of it once its onboard controller has been compromised. The alternate way of communication is generally more difficult to block and in most instances illegal to do so in comparison to the present ways of communication.

In one aspect of the present invention, a method for remotely reestablishing operational control of a function of a device after operational control of the device function has been lost, at least partially, due to malicious interference by a third party, may include steps of:

integrating an onboard primary controller into the device, wherein the onboard primary controller is adapted to control at least one function of the device;

providing a base controller adapted to communicate with the onboard primary controller via a first mode of communication in order to provide instructions by which said onboard primary controller is to control said at least one device function; and integrating an auxiliary controller module into the device, wherein the auxiliary controller is adapted to communicate with the base controller via a second mode of communication different from the first mode of communication between said onboard primary controller and said base controller, such that said auxiliary controller module functions as a backup to temporarily take over control of said at least one device function, in place of said onboard primary controller, when said at least one device function is rendered non-responsive to operator-attempted communication from said base controller to said onboard primary controller, wherein communication from said base controller to said auxiliary controller module, via said second mode of communication, relies upon a coded messaging scheme requiring communication of a predetermined specific code, from said base controller to said auxiliary controller module, which activates said auxiliary controller module to disable, and take over control from, said onboard primary controller in response to receipt of said predetermined specific code, and wherein said predetermined specific code is known only by the operator of said base controller and by said auxiliary controller module.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
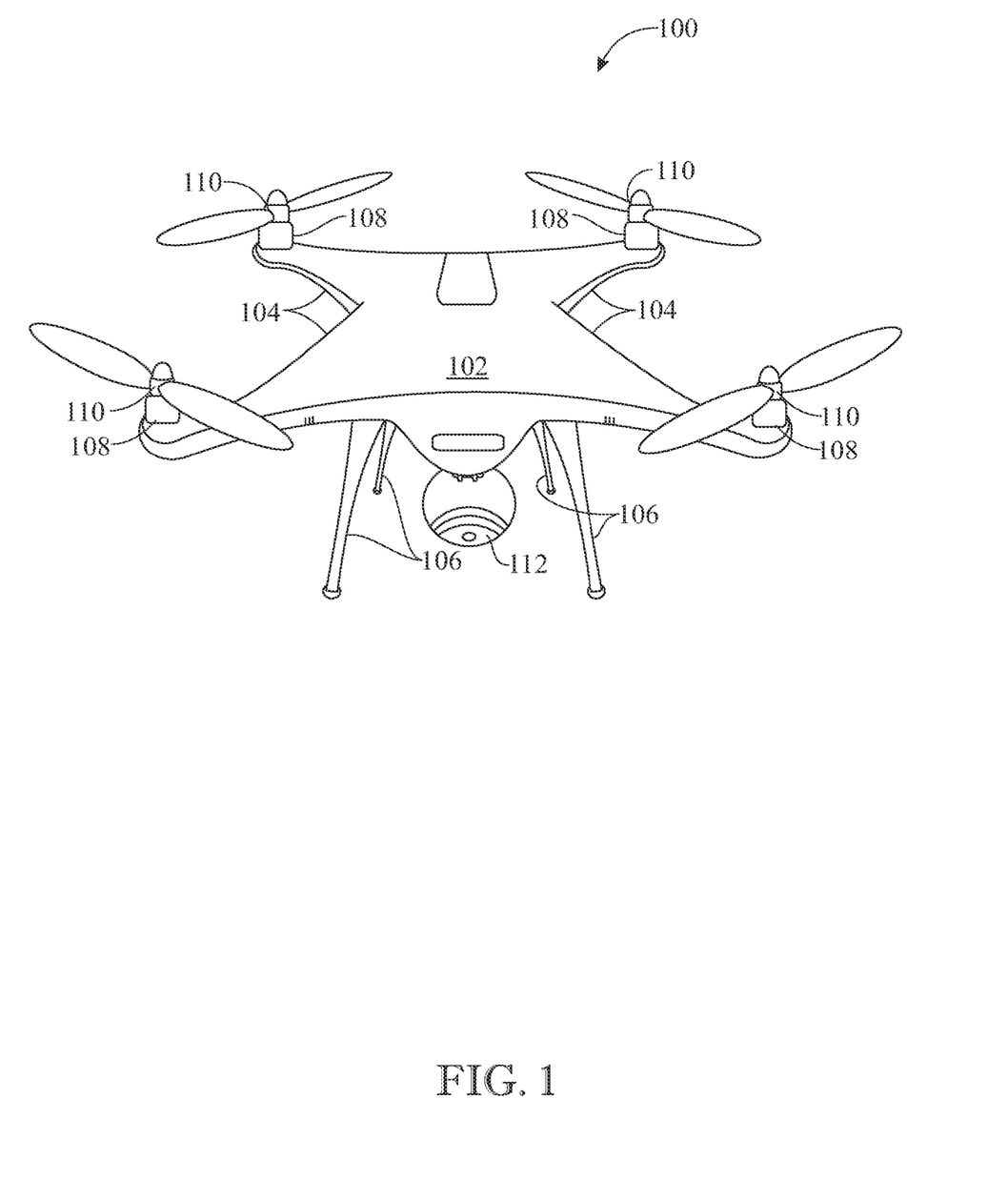
FIG. 1 presents a top front view of a prior art exemplary embodiment of a remotely controlled device, namely an unmanned aerial vehicle (UAV) commonly referred to as a drone.

Referring to FIG. 1, there is illustrated a prior art exemplary embodiment of a remotely controlled device, generally designated 100, in the form of an unmanned aerial vehicle (UAV) commonly known as a drone. It should be understood that the remotely controlled device 100 may be a different form of remotely controlled vehicle, such as an automobile. When in the form of a drone, the remotely controlled device 100 typically includes an airframe body 102 having a plurality of outward projecting rotor arms 104 and a plurality of downward projecting legs 106. The legs 106 support landing the remotely controlled device 100 in an upright horizontal orientation. At their outer ends, the rotor arms 104 mount motors 108 drivingly coupled to rotors 110 disposed above the motors and outer end of the rotor arms. The airframe body 102 also may support a camera 112.

Figure 2:
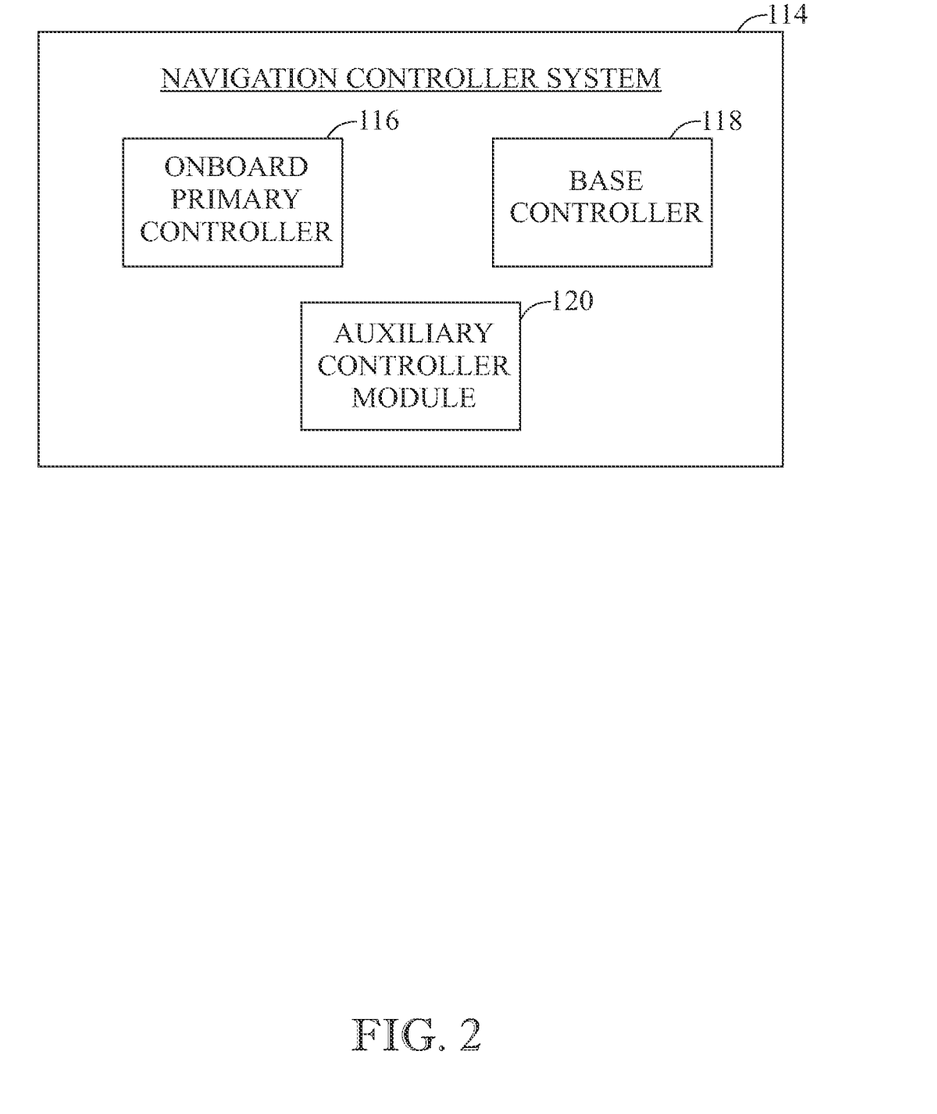
FIG. 2 presents a general block diagram of an exemplary embodiment of a navigation controller system for retrieving control of a remotely controlled device in accordance with aspects of the present invention.

Referring now to FIG. 2, there is illustrated a navigation controller system 114, and the components thereof, for retrieving control of the remotely controlled device 100 in accordance with aspects of the present invention. The navigation controller system 114 generally includes a remote unit in the form of an onboard primary controller 116 that incorporates the components shown in FIG. 3, a base controller 118 that incorporates the components shown in FIG. 4, and an auxiliary controller module 120 that incorporates the components shown in FIG. 5.

Figure 3:
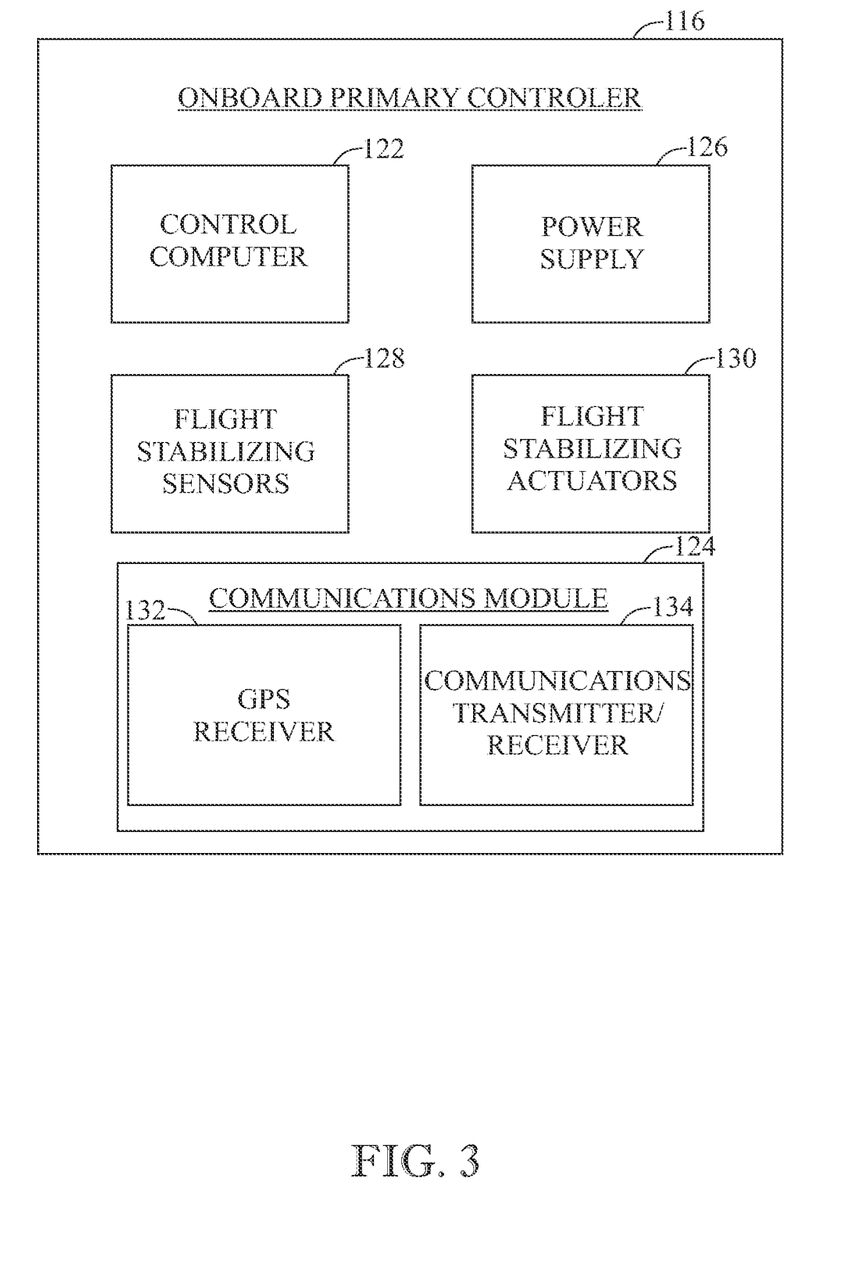
FIG. 3 presents a detailed block diagram of an exemplary embodiment of an onboard primary controller, which may be one of the components of the navigation controller system.

Referring to FIG. 3, there is illustrated the onboard primary controller 116 of the navigation controller system 114. The onboard primary controller 116 is supported on the airframe body 102 of the remotely controlled device 100. The onboard primary controller 116 may include a control computer 122, a communications module 124, a power supply 126, and flight stabilizing sensors 128 and actuators 130. The communications module 124 may include a global positioning system (GPS) receiver 132 for determining coordinates of the location of the remotely controlled device and a communications receiver/transmitter 134 utilizing a predetermined first mode of communications for communicating with the base controller 118. The onboard primary controller 116 is adapted to control, for example, operation of the motors 108, and thus the rotors 110, and also operation of the camera 112, in controlling the operation of the remotely controlled device 100.

Figure 4:
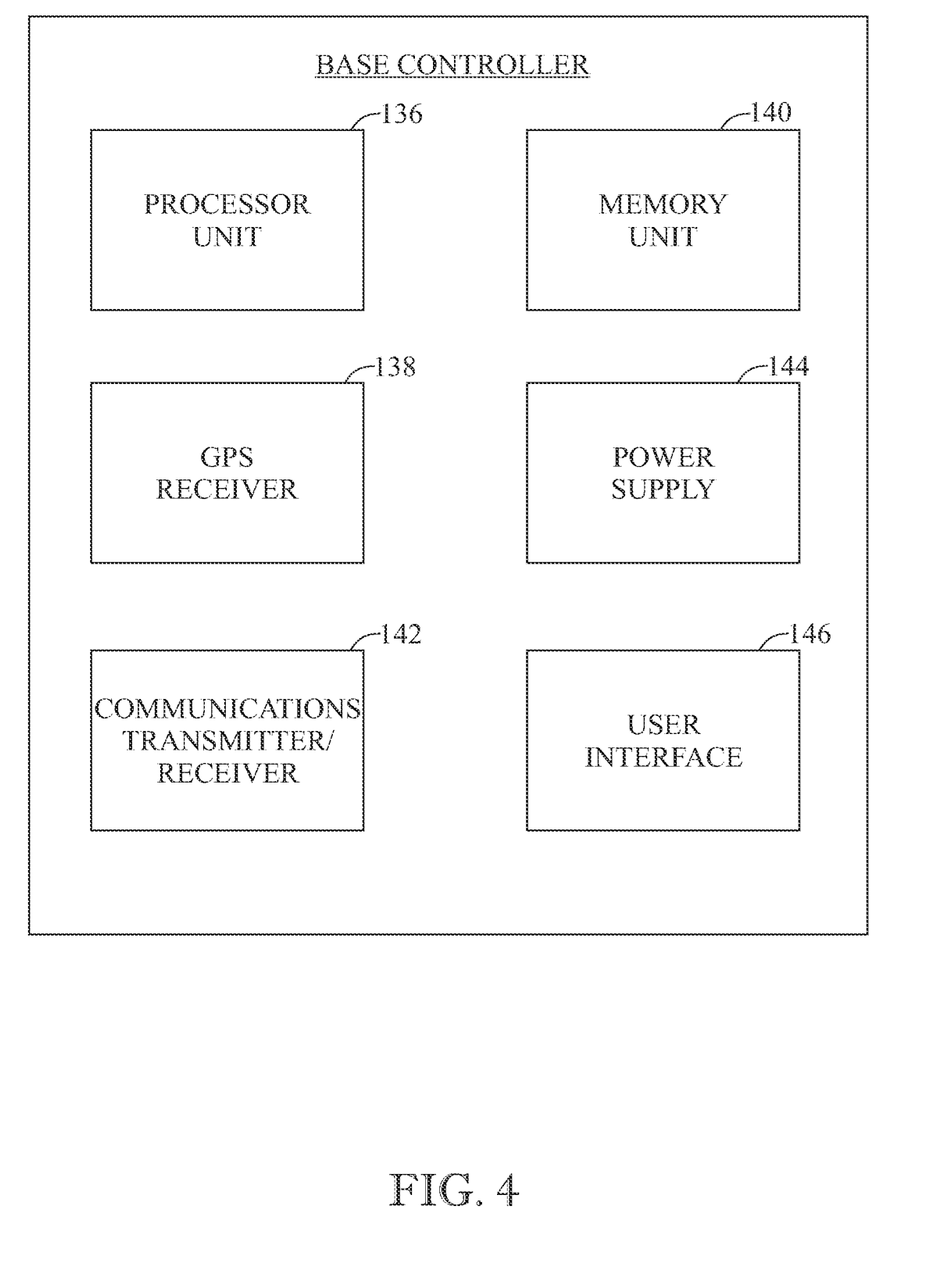
FIG. 4 presents a detailed block diagram of an exemplary embodiment of a base controller, which may be one of the components of the navigation controller system.

Referring now to FIG. 4, there is illustrated the base controller 118 of the navigation controller system 114. The base controller 118 may be portable, typically adapted to be held by or in the possession of a user operator. The base controller 118 may have a processor unit 136, a global positioning system (GPS) receiver 138 for determining coordinates of the location of the base controller, a memory unit 140 connected to the processor unit 136, a communications transmitter/receiver 142 utilizing the predetermined first mode of communications for communicating with the onboard primary controller 116, a power supply 144, and a user interface 146. The base controller 118 may be a portable cellular phone, such as an iPhone® or a Blackberry® mobile device, a laptop computer or other portable electronic device. The predetermined first mode of communications the onboard primary controller 116 and base controller 118 use to communicate with each other may be, for example, RF signals, although alternatively may be Bluetooth, cellular etc., signals, to provide instructions by which to control and operate the remotely controlled device 100. The control operations performed by the onboard primary controller 116 and the base controller 118 are conventionally well-known, such as by way of example presented in the disclosure of U.S. Pat. No. 7,231,294. The disclosure of this patent is hereby incorporated herein by reference thereto.

Figure 5:
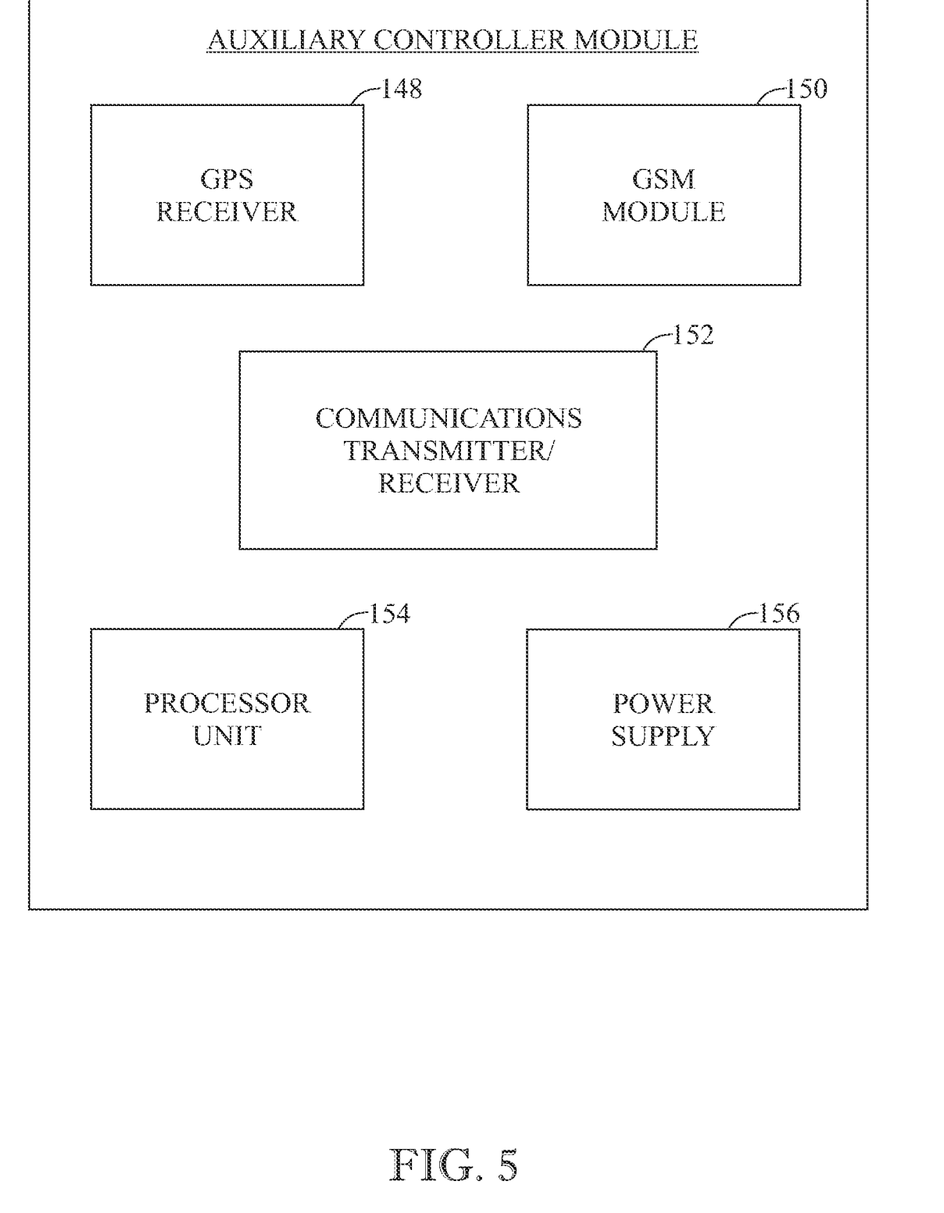
FIG. 5 presents a detailed block diagram of an exemplary embodiment of an auxiliary controller module in accordance with aspects of the present invention, which may be one of the components of the navigation controller system.

Referring to FIG. 5, there is illustrated the auxiliary controller module 120 of the navigation controller system 114, in accordance with aspects of the present invention. The auxiliary controller module 120 may include a GPS receiver 148 for determining coordinates of the location of the auxiliary controller module, a global system for mobile communications (GSM) module 150, a communications transmitter/receiver 152, and a processor unit 154 and a power supply 156 for enabling operation of the communications transmitter/receiver, GPS receiver, and GSM module. As an added safety feature, the power supply 156 equipped on to auxiliary controller module 120 is able to provide power to the aforementioned equipment even when the primary power supply 126 to the onboard primary controller 116 has dwindled. The auxiliary controller module 120 may be either separately retrofitted on the remotely controlled device 100 or integrated into its onboard primary controller 116. The auxiliary controller module 120 operates in accordance with GSM standards. It does not communicate with the base controller 118 using the same mode of communications signals as does the onboard primary controller 116, but by an alternate way in the form of a predetermined second mode of communications to send instructions, such cellular signals as coded short message service (SMS) messaging, or mobile phone call using 3G/4G/LTE systems, from the base controller. It is contemplated that the first and second modes of communications may be reversed such that, for example, communications between the onboard primary controller 116 and base controller 118 may be by cellular signal mode while communications between the base controller 118 and auxiliary controller module 120 may be by RF signal mode.

The portable cellular phone of the base controller 118, via its own GSM module, using a subscriber identity module (SIM) card and employing the short message service (SMS), may communicate with and send a text message embodying a predetermined specific (such as an alphanumeric) code to the GSM module 150 of the auxiliary controller module 120. The auxiliary controller module 120 remains dormant till the authentication code and specific code, known only by the operator of the base controller 118 and by the auxiliary controller module 120 on the remotely controlled device 100, is sent by the base controller to the auxiliary controller module. In the event the operator notices that the ability of the onboard primary controller 116 to communicate via RF signals, for example, with the base controller 118 fails for whatever reason, the auxiliary controller module 120 may be activated by receipt of the specific code communicated via non-RF signals from the operator of the base controller 118 to the auxiliary controller module. The authentication and specific code may be sent merely by a simple push of a button by the operator of the base controller. Thus, the auxiliary controller module 120 functions as a backup and disconnects, disables or otherwise takes over control in place of, the onboard primary controller 116 in response to receipt of the authentication and specific code. Even if the onboard primary controller 116 does not fail, such as when the operator realizes the remotely controlled device 100 is hijacked, lost or otherwise not responding to the primary RF controls, the auxiliary controller module 120 responds to receipt of the authentication and specific code by cutting off further control from the onboard primary controller and forces the remotely controlled device to comply with a new set of pre-programmed, on-the-fly instructions (or commands) in order to safely retrieve the remotely controlled device, or at the very least, send out the location of the device to the operator of the base controller 118.

Figure 6:
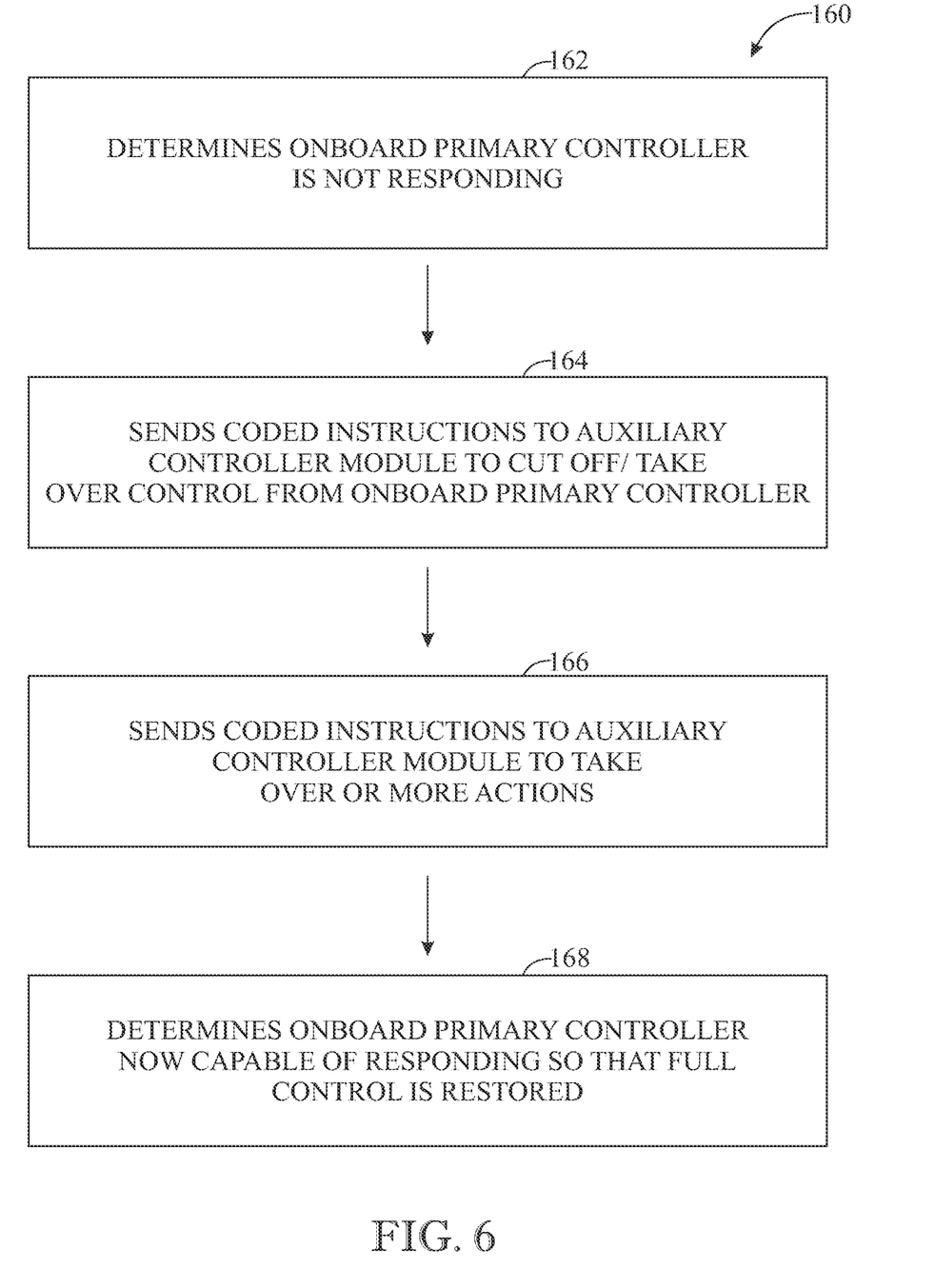
FIG. 6 presents in a flow diagram an exemplary embodiment of a method for retrieving control of a remotely controlled device in accordance with aspects of the present invention.

Referring to FIG. 6, there is illustrated a flow diagram, generally designated 160, of an exemplary embodiment of a method of retrieving control of a remotely controlled device 100 in accordance with aspects of the present invention. As per initial step 162, the operator of the base controller 118 determines that the onboard primary controller 116 is not responding. As per next step 164, the operator directs the base controller 118 to send alternate instructions (or commands) via coded SMS messages that includes an authentication code to the auxiliary controller module 120 on the remotely controlled device 100 to cut off the onboard primary controller 116 and disconnect, disable or otherwise take over control of the remotely controlled device from the onboard primary controller 116. As per next step 166, the instructions (or commands) via the coded SMS messages also indicate one or more of several possible alternative actions that the auxiliary controller module 120 is to take, as follows: (A1) the remotely controlled device 100 is to return to base; (A2) the remotely controlled device 100 is to go to a specific location specified in the coded SMS; (A3) the auxiliary controller module 120 is to send current coordinates of the remotely controlled device 100 to the base controller 118 (and/or to other specified recipients); (A4) the auxiliary controller module 120 is to track the path of the remotely controlled device 100 and send the path information to the base controller 118 (and/or to other specified recipients); (A5) the auxiliary controller module 120 is to provide the coordinates of the current location and/or location history of the remotely controlled device 100 to the base controller 118; and/or (A6) any other command from the base controller (such as in an extreme case, an instruction, or command, that the remotely controlled device 100 self-destruct). As per final step 168, the onboard primary controller 116 may be restored to full control of the remotely controlled device 100 should the operator determine that the onboard primary controller 116 is out of jamming range and now capable of responding and resuming such control. The auxiliary controller module 120 is not intended to be used to control the remotely controlled device 100 full-time; instead, it is specifically designed to be used as a failsafe device when normal control has failed.

The auxiliary controller module 120 may be implemented as a standalone device or an integrated device according to different shapes, sizes and styles desired by users. It is perceived that the dimensions may be as small within the range of about 2.5 cm×5 cm×2.5 cm-4 cm×1 cm. With regard to either standalone or integrated options, end users, either companies or individuals, who are currently or planning to use remotely controlled devices 100 may wish to protect their investment by being able to have an alternative means of communicating with their remotely controlled devices (e.g. a phone app). Also, law enforcement may also find use for the auxiliary controller module 120 to provide the failsafe option as illegal in most jurisdictions to jam or block communication signals. If the remotely controlled device 100 is stolen, or lost, the user who has deployed the auxiliary controller module 120, as heretofore described, may access it via SMS and receive a real-time location or set off a buzzer to alert local authorities. In another implementation, the contingency auxiliary controller module 120 may also be outfitted with an audio output component, such as a auditory device (e.g. a speaker), which can send out various noises like ones that mimic an eagle, etc., to protect the remotely controlled device 100 against an attack by another bird of prey.

As will be readily apparent to those skilled in the art, the system and method of the present invention may be adapted for use in connection with vehicles, such as conventional automobiles and trucks, which are not necessarily considered remotely-controlled vehicles in the traditional sense of the term (i.e. vehicles that are not normally controlled remotely, but have the ability to be remotely controlled in a limited manner). For instance, most automobiles are not configured to be controlled remotely in the traditional sense; yet discrete onboard systems may be configured for remote access with respect to telematics services (i.e. vehicle systems combining GPS and cellular technologies with onboard electronics). Some examples include in-vehicle security, emergency services, hands-free calling, turn-by-turn navigation, and remote diagnostics. Furthermore, such onboard systems are being increasingly adapted to enable remote engine starting and shutdown, vehicle tracking, etc. Accordingly, such systems are becoming increasingly susceptible to undesirable outside interference, or hacking. Furthermore, so-called autonomous vehicles, while operating substantially on their own with little or no ongoing control from a remote operator, are susceptible to having their control taken over remotely by a bad actor—which could have disastrous consequences. In that regard, the system and method of the present invention may be employed to provide an alternate or redundant system capable of counteracting hijacked control of such vehicle functionalities.

Similarly, the present system and method may be adapted for use with autonomous vehicles (e.g. self-driving vehicles) that are capable of sensing their environment and moving safely with little or no human input. Such autonomous vehicles combine a variety of sensors to perceive their surroundings, such as radar, light detection and ranging (i.e., Lidar), sonar, GPS, odometry and inertial measurement units. Advanced control systems interpret sensory information to identify appropriate navigation paths, as well as obstacles and relevant signage. The potentially disastrous consequences of third party hijacking of such sensing systems are obvious. The system of the present invention may be adapted for use with such vehicles in order to enable a legitimate vehicle operator to regain control of such systems.

Furthermore, the present system and method may be adapted for use with ships and other water craft (both submersible and non-submersible), whether autonomous or semi-autonomous, that are likewise susceptible to the aforementioned undesirable exterior interference by bad actors. The device components of the present invention employs relatively simplistic mechanisms, which would not require much space and, therefore, could be secreted just about anywhere. The more discreet the system component locations, the greater the likelihood of their successful integration and deployment. For instance, an implementation of the system utilizing satellite as a method of communication would incorporate connection to a satellite receiver somewhere on the vessel/craft—possibly, separately integrated (e.g., separately wired) with existing satellite dishes on the vessel/craft. Moreover, the present device may be connected to a traditional RF receiver. Where the inventive device is connected with a satellite receiver, the aforementioned "coded" signals could be transmitted from just about any remote location. On the other hand, where an RF system is employed, the remote communication range may be limited.

Furthermore, the present system and method may be adapted for use with completely non-autonomous ships (e.g. oil tankers), which are susceptible to having their operations taken over via piracy, wherein a crew member of the pirated ship is forced to captain/drive the ship. In accordance one scenario, the crew member could employ the inventive system to disable ship controls using specific commands, wherein the controls can only be re-enabled remotely via coded signals—through the same frequency or an alternate frequency. In another scenario where the ship is not disabled, but the owner of the ship becomes aware of the loss of communication/control of the ship, the ship owner could employ coded messaging on an alternate frequency/method to determine the ship's location in order to direct rescue efforts, issue remote commands to shut off the ship's engine, electrical power, etc. The present system may further incorporate a multi-authentication methodology for initiating the coded message. For instance, initiating a coded message could involve a countersigning method, wherein two or more parties (e.g., an insurance company and ship owner) are required to each provide individual portions of the full code. Alternatively, for control via a short range communication method, the present invention could potentially be used by rescue personnel to trigger an event (e.g., engine shutdown, power cutoff, etc.) just prior to boarding and retaking control of the ship. Again, as a result of the simplicity of the system/device components, the system is easily adaptable for installation almost anywhere on the ship. In a most simple implementation, the device can be integrated in-line with one of the power wires connecting power to the control center on the ship's bridge. Upon receiving a coded message, the system would simply shut off the switch and thereby ceasing power—which could then be regained via a coded message. In a more sophisticated implementation, the coded message may be used to trigger a master override that would lock out the bridge controls via software, while still maintaining remote control via coded messaging.

Finally, the present system and method may even be adapted for use in connection with industrial plants susceptible to outside interference in the form of cyberattacks. For instance, the system may employ a software-based control mechanism. For instance, where a water treatment plant computer system has been breached and gates opened to mix treated and untreated water supplies, a coded message could be remotely communicated to disrupt the function by either software or even hardware switches. In this instance, a multi-authentication scheme would be appropriate. To wit, two or more individuals may be required to input respective secret codes to activate the system/device of the present invention, wherein the device could be configured/adapted to maintain root access and lock out all terminals if need be, or even issue commands to cut off power to appropriate discrete components, thereby minimizing any damage resulting from the malicious cyberattack. Depending upon the voltage of the component intended to be cut off by the inventive device, a variety of different types of electromechanical relays may be employed.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. A method for remotely reestablishing operational control of a function of a device after operational control of the device function has been lost, at least partially, due to malicious interference by a third party, the method comprising steps of:
    integrating an onboard primary controller into the device, wherein the onboard primary controller is adapted to control at least one function of the device;
    providing a base controller adapted to communicate with the onboard primary controller via a first mode of communication in order to provide instructions by which said onboard primary controller is to control said at least one device function; and
    integrating an auxiliary controller module into the device, wherein the auxiliary controller is adapted to communicate with the base controller via a second mode of communication different from the first mode of communication between said onboard primary controller and said base controller, such that said auxiliary controller module functions as a backup to temporarily take over control of said at least one device function, in place of said onboard primary controller, when said at least one device function is rendered non-responsive to operator-attempted communication from said base controller to said onboard primary controller,
    wherein communication from said base controller to said auxiliary controller module, via said second mode of communication, relies upon a coded messaging scheme requiring communication of a predetermined specific code, from said base controller to said auxiliary controller module, which activates said auxiliary controller module to disable, and take over control from, said onboard primary controller in response to receipt of said predetermined specific code, and wherein said predetermined specific code is known only by the operator of said base controller and by said auxiliary controller module.

2. The method recited in claim 1, wherein said first mode of communication between said base controller and said onboard primary controller further comprises radio frequency signals.

3. The method recited in claim 2, wherein said second mode of communication between said base controller and said auxiliary controller module further comprises cellular signals.

4. The method recited in claim 1, wherein said first mode of communication between said base controller and said onboard primary controller further comprises cellular signals.

5. The method recited in claim 4, wherein said second mode of communication between said base controller and said auxiliary controller module further comprises radio frequency signals.

6. The method recited in claim 1, wherein the coded messaging scheme associated with said second mode of communication between said auxiliary controller module and said base controller further comprises a coded short message service messaging scheme employing a predetermined specific code that activates said auxiliary controller module to take over control from said onboard primary controller in response to receipt of said specific code.

7. The method recited in claim 1, wherein said auxiliary controller module includes a global system for mobile communications (GSM) module.

8. The method recited in claim 7, wherein said second mode of communication between said auxiliary controller module and said base controller operates in accordance with a set of GSM standards utilizing a subscriber identity module (SIM) card and employing a short message service (SMS) messaging that communicates with said auxiliary controller module, and sends a text message to said auxiliary controller module that incorporates a predetermined authentication code and specific code, which activate said auxiliary controller module to take over control from said onboard primary controller in response to receipt of said authentication code and specific code.

9. The method recited in claim 1, wherein the auxiliary controller module integrated into the device further comprises:
    a global system for mobile communications (GSM) module;
    a global positioning system (GPS) receiver;
    a communications transmitter/receiver; and
    a processor unit and power supply for enabling operation of said GSM module, GPS receiver and communications transmitter/receiver.

10. The method recited in claim 9, wherein the GPS receiver is adapted to determine coordinates of the location of said auxiliary controller module.

11. The method recited in claim 9, wherein said GSM module operates in accordance with a set of GSM standards for receiving a mode of communication utilizing a subscriber identity module (SIM) card and a short message service (SMS) messaging that communicates with and receives a text message embodying a predetermined specific code that activates said auxiliary controller module to take over control in place of an onboard primary controller in response to receipt of said specific code.

12. The method recited in claim 1, wherein the device is integrated with an autonomous vehicle.

13. The method recited in claim 1, wherein the device is integrated with a semi-autonomous vehicle.

14. The method recited in claim 1, wherein the device is integrated with a water craft.

15. The method recited in claim 14, wherein the water craft further comprises a non-autonomous ship.

16. The method recited in claim 15, wherein the device is integrated in-line with a power wire connecting power to a control center on a bridge of said non-autonomous ship.

17. The method recited in claim 1, wherein the device is integrated with an industrial plant.

18. The method recited in claim 17, wherein device further comprises at least one of a software switch and a hardware switch.

* * * * *